(12) United States Patent
Ezell et al.

(10) Patent No.: US 9,591,036 B2
(45) Date of Patent: *Mar. 7, 2017

(54) METHOD AND APPARATUS FOR DYNAMIC DEVICE PAIRING

(71) Applicant: Avaya Inc., Santa Clara, CA (US)

(72) Inventors: Joel M. Ezell, Broomfield, CO (US); Stephen R. Durney, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,048

(22) Filed: Dec. 30, 2015

(65) Prior Publication Data

US 2016/0112471 A1 Apr. 21, 2016

Related U.S. Application Data

(60) Continuation of application No. 14/192,278, filed on Feb. 27, 2014, now Pat. No. 9,271,104, which is a division of application No. 13/595,626, filed on Aug. 27, 2012, now Pat. No. 8,700,019.

(51) Int. Cl.
| | |
|---|---|
| *H04M 3/42* | (2006.01) |
| *H04L 29/06* | (2006.01) |
| *H04W 4/16* | (2009.01) |
| *H04W 4/00* | (2009.01) |
| *H04W 76/02* | (2009.01) |

(52) U.S. Cl.
CPC ...... *H04L 65/1096* (2013.01); *H04L 65/1006* (2013.01); *H04L 65/1069* (2013.01); *H04W 4/001* (2013.01); *H04W 4/16* (2013.01); *H04W 76/022* (2013.01)

(58) Field of Classification Search
CPC ............ H04W 8/245; H04M 3/42042; H04M 1/72519; G06Q 10/107
USPC ........................ 455/418, 415, 550.1; 709/207
See application file for complete search history.

(56) References Cited

U.S. PATENT DOCUMENTS

| | | | |
|---|---|---|---|
| 5,696,880 A | 12/1997 | Gustafson et al. | |
| 6,754,708 B1 | 6/2004 | Sabatier et al. | |
| 8,264,958 B1 * | 9/2012 | Pankajakshan | H04W 72/048 370/230.1 |

(Continued)

FOREIGN PATENT DOCUMENTS

| | | |
|---|---|---|
| KR | 1020080050044 | 6/2008 |
| KR | 1020100076036 | 7/2010 |
| KR | 1020100121404 | 11/2010 |

OTHER PUBLICATIONS

"Splices—how to manage multiple media sessions," VoIP-Forum, May 6, 2011, [retrieved from: http://www.voip-forum.com/ietf/2011-05/splices/].

(Continued)

*Primary Examiner* — Danh Le
(74) *Attorney, Agent, or Firm* — Sheridan Ross P.C.

(57) ABSTRACT

A communication system, method, and components are described. Specifically, a communication system that supports dynamic device pairing of communication devices is described. Such pairing is accomplished using a feature or pairing server, without requiring modification to associated communication endpoints. Moreover, sequenced applications can be applied for all communication endpoints when pairing is in effect.

19 Claims, 7 Drawing Sheets

(56) References Cited

U.S. PATENT DOCUMENTS

| | | | |
|---|---|---|---|
| 8,700,019 B2 | 4/2014 | Ezell | |
| 8,862,681 B2 | 10/2014 | Ramanathan | |
| 8,886,820 B2* | 11/2014 | Suciu | H04W 36/0011 |
| | | | 455/436 |
| 9,148,308 B2* | 9/2015 | Qiu | H04L 12/66 |
| 9,271,104 B2 | 2/2016 | Ezell | |
| 2005/0074017 A1* | 4/2005 | Qian | H04M 3/2263 |
| | | | 370/401 |
| 2007/0214501 A1* | 9/2007 | Muramoto | H04L 63/0236 |
| | | | 726/11 |
| 2009/0167524 A1 | 7/2009 | Chesnutt et al. | |
| 2009/0170539 A1 | 7/2009 | Kortge et al. | |
| 2009/0323636 A1 | 12/2009 | Dillon et al. | |
| 2010/0220635 A1 | 9/2010 | Gisby et al. | |
| 2010/0278345 A1 | 11/2010 | Alsina et al. | |
| 2011/0131406 A1 | 6/2011 | Jones et al. | |
| 2011/0225173 A1 | 9/2011 | Gulhane et al. | |
| 2012/0128154 A1 | 5/2012 | Ran | |
| 2012/0257740 A1 | 10/2012 | Kannappan et al. | |
| 2012/0294174 A1* | 11/2012 | Ahn | H04W 28/20 |
| | | | 370/252 |
| 2013/0125224 A1 | 5/2013 | Kaufman | |
| 2013/0179186 A1 | 7/2013 | Birtwhistle et al. | |
| 2013/0254302 A1* | 9/2013 | Ezell | H04L 67/141 |
| | | | 709/206 |
| 2014/0063334 A1 | 3/2014 | McBride et al. | |
| 2014/0089457 A1* | 3/2014 | Ohrstrom-Sandgren | G06F 8/65 |
| | | | 709/217 |
| 2014/0089505 A1* | 3/2014 | Haserodt | H04L 67/34 |
| | | | 709/225 |
| 2014/0089915 A1* | 3/2014 | Haserodt | G06F 8/61 |
| | | | 717/178 |
| 2014/0090020 A1* | 3/2014 | Meiners | H04L 67/34 |
| | | | 726/4 |

OTHER PUBLICATIONS

Cooper et al. "looSely-couPLed slp deviCES (splices)" IETF Tools, Splices Status Pages, Aug. 24, 2010, 2 pages [retrieved from: http://tools.ietf.org/wg/splices/charters].

IETF Splices Index, http://www.ietf.org/mail-archive/web/splices/current/maillist.html.

Notice of Allowance With English Translation for Korea Patent Application No. 2013-0075281, dated Sep. 30, 2014 4 pages.

Official Action for U.S. Appl. No. 13/595,626, mailed Sep. 25, 2013.

Notice of Allowance for U.S. Appl. No. 12/595,626, mailed Nov. 19, 2013.

Official Action for U.S. Appl. No. 14/192,278, mailed Apr. 14, 2015 7 pages Restriction Requirement.

Official Action for U.S. Appl. No. 14/192,278, mailed Jun. 9, 2015 9 pages.

Notice of Allowance for U.S. Appl. No. 14/192,278, mailed Oct. 28, 2015 8 pages.

* cited by examiner

METHOD AND APPARATUS FOR DYNAMIC DEVICE PAIRING

CROSS REFERENCE TO RELATED APPLICATION

The present application is a continuation of U.S. patent application Ser. No. 14/192,278, filed Feb. 27, 2014, entitled "METHOD AND APPARATUS FOR DYNAMIC DEVICE PAIRING", which is a divisional of U.S. patent application Ser. No. 13/595,626, filed Aug. 27, 2012, entitled "METHOD AND APPARATUS FOR DYNAMIC DEVICE PAIRING", which is incorporated herein by this reference in its entirety.

FIELD

The disclosure relates to pairing communication devices within a communication system.

BACKGROUND

It is often advantageous to allow a user of a communication system to access different communication devices. For example, a user associated with a desk phone in the user's office may wish to access a phone in a different room. As a further example, users may have need of different communication capabilities for different communications, and those capabilities may be best supported by different communication devices. In such situations, it is often desirable to present the device used to support the communication (i.e., the media stream) to other communication devices and/or the communication system as the user's personal device. Similar situations arise when advanced call control is desired from a softclient running on a computing device.

Systems have been developed that allow a user to forward calls from a communication device associated with a communication address, to an alternate communication device. However, communications placed from the alternate device are typically not presented to called parties as being associated with the communication address of the user's primary device. In addition, communications conducted in connection with an alternate device using call forwarding are generally made without the application of call features or restrictions associated with the primary device.

Still other systems have been developed that pair an alternate device to a user's primary device. For example, systems have been developed to support telecommuters, to enable users to present a consistent communication address to called and calling parties. However, such systems suffer from deficiencies with respect to the application of calling features and restrictions. For example, where pairing is accomplished by a mechanism outside of a server responsible for applying other features and restrictions, that other server may be unaware of a pairing that has been implemented. As a result, the features and restrictions applied to a call involving paired devices may be those associated with a paired device, rather than a pairing device or both the pairing and paired devices. This can in turn result in a failure to apply restrictions that should be enforced with respect to the call and/or in desired features being unavailable.

SUMMARY

Embodiments of the present disclosure are directed to solving these and other problems and disadvantages of the prior art. According to embodiments of the present disclosure, systems and methods are provided that operate to pair communication devices. Pairing is accomplished such that features and restrictions associated with both the pairing and paired communication devices can be applied. Features and restrictions can be applied even if the mechanism that implements the pairing is separate from the server or other device responsible for providing features and/or enforcing restrictions associated with the devices. Moreover, a pairing device may continue to exercise control of a communication associated with a paired device, even when the media stream is directed to the paired device.

A system in accordance with embodiments of the present disclosure includes a pairing server or module that provides or executes a dynamic device pairing (DDP) application or function. The pairing server operates to implement the pairing of two communication devices. In particular, both the pairing and paired devices of a communication device pair are associated with the call. However, the media is routed to the paired device by using the session description protocol (SDP) identifier for the paired device. The pairing device is placed in a far end hold. Accordingly, a media path is established to the paired device, while control is maintained at the pairing device. In addition, to other endpoints in the call, the pairing device appears as a party to the call, while the paired device does not. In accordance with embodiments of the present disclosure, the pairing can be implemented at the request of a user, for example by providing user input at the pairing device that is sent to the pairing server to effect the pairing.

When a user associated with paired devices receives an inbound call, the dynamic device pairing application may be invoked after all other terminal applications associated with the inbound call have been invoked. The INVITE message for the call is sent to both the pairing and paired devices. When the user answers on the paired device, the paired device's SDP answer is sent back to the communication device of the caller, and a media channel is established between the paired device and the caller's communication device. The control dialog to the controlling pairing device will also be established, but it will appear to the pairing device that it is in far end hold. The pairing device is thus able to control the call while the user is talking on the paired device.

When an outbound call is placed by a user associated from a pairing device, the dynamic device pairing application or function may be origination sequenced before all other sequential applications. For example, the origination sequence can be paused while the DDP application initiates a call to the paired device. When the user answers at the paired device, the DDP application issues a REFER message, asking that paired device initiate a call back to the DDP application with an SDP offer. This SDP offer is substituted for that sent by the pairing device, and the origination sequence can be resumed. Alternatively, a slow start INVITE can be used where the media is established after the SIP threeway handshake (INVITE/200OK/ACK). All remaining origination applications (e.g., a call recording application) for the calling user are then sequenced. When the far end answers, the 200 OK message with the SDP answer is sent along to the paired device and a media path is established between the paired device and the called device. The pairing device is placed on far end hold, with the result that the pairing device is capable of controlling the call while the media is sent to the paired device to enable the user to talk using the paired device. In the example of a call recording application, the call recording application could be provisioned to record all calls that the pairing user makes or receives, and the architecture described herein would allow that to happen even for calls where the media goes to the paired device.

Additional features and advantages of embodiments of the present disclosure will become more readily apparent from the following description, particularly when taken together with the accompanying drawings.

BRIEF DESCRIPTION OF THE DRAWINGS

FIGS. 3A-1, 3A-2, 3B-1 and 3B-2 illustrate call flow scenarios in accordance with embodiments of the present disclosure.

DETAILED DESCRIPTION

Figure 1:
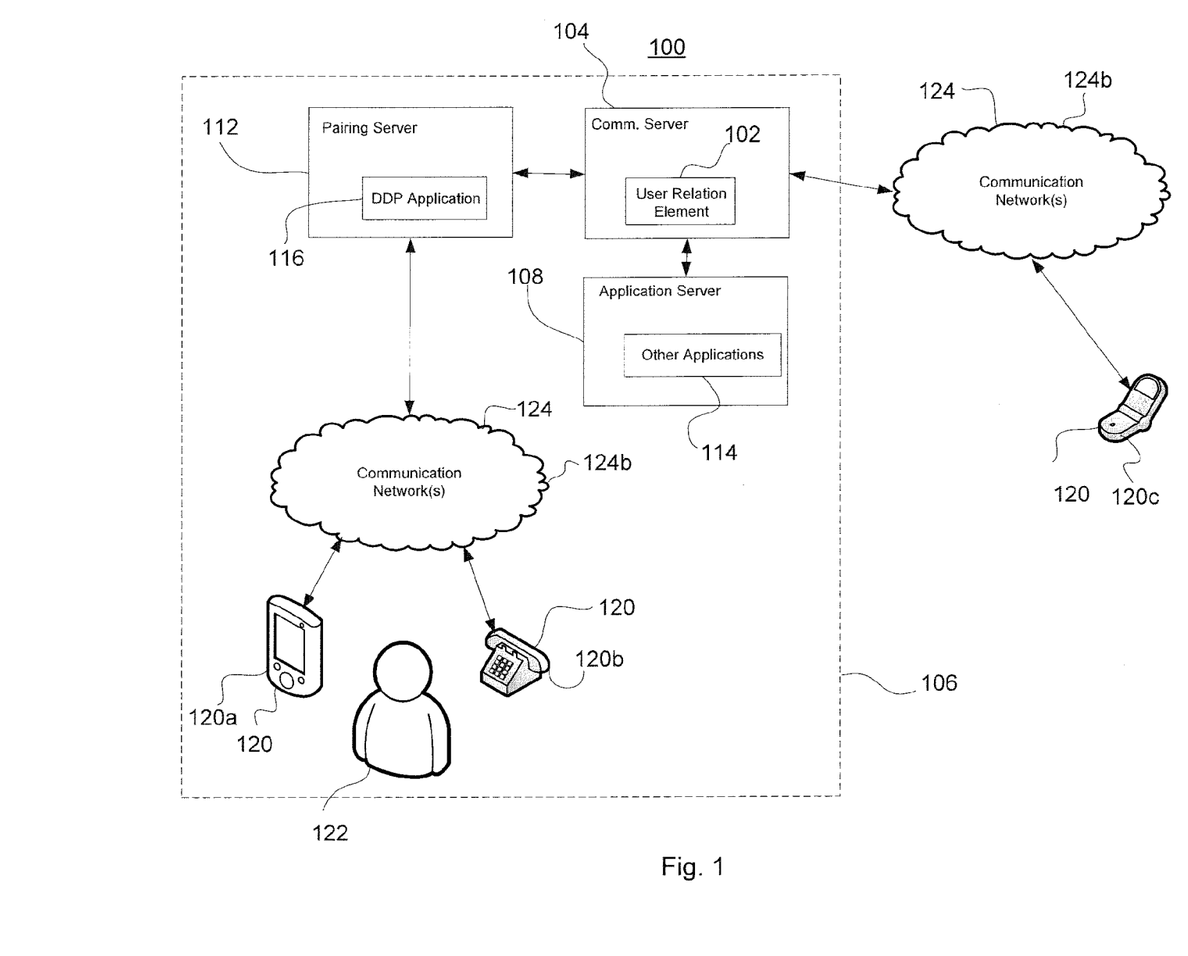
FIG. 1 is a block diagram depicting components of a communication system in accordance with embodiments of the present disclosure.

FIG. 1 is a block diagram depicting components of a communication system 100 capable of implementing dynamic device pairing in accordance with embodiments of the present disclosure. In general, the system 100 includes a communication server 104 having a user relation element 102, one or more application servers 108 providing one or more applications 114, and a pairing server 112 providing a dynamic device pairing (DDP) application 116. In some embodiments, one, some, or all of the servers 104, 108, 112 are associated with an enterprise communication system 106. The communication server 104 may employ the user relation element 102 to identify application sequences for different users (e.g., according to user preferences, administrative rules, etc.). The user relation element 102 may include a table or similar type of data structure that maps a user's communication preferences to a sequence of applications that are to be invoked for the user when the user either places an outbound call or receives an inbound call. Upon receiving a communication-initiating message (e.g., an INVITE message), the communication server 104 may employ the user relation element 102 to determine the next application to include in the calling or called user's application sequence and, based on such a determination, route the communication-initiating message to the appropriate server 108, 112.

Stated another way, the communication server 104 may facilitate the establishment of various application sequences for communication sessions of users belonging to the enterprise communication system 106. In some embodiments, the communication server 104 may establish the applications as Back-to-Back User Agents (B2BUAs) or proxies in the signaling and/or media path of a communication session. The manner in which the appropriate applications are sequenced will be described in further detail herein. These sequenced applications 114, 116 can be provided to select and control the running of services or features associated with a communication session between communication devices 120, and/or to enforce restrictions associated with communication devices 120.

The DDP application 116 represents one specific type of application that enables a user 112 to dynamically pair one communication device 120 with another communication device 120. Examples of suitable types of other applications 114 include, without limitation, call recording applications, Find-me/Follow-me applications, Extension to Cellular (EC-500) applications, call forwarding applications, coverage applications (e.g., voicemail, transfer to assistant, etc.), encryption applications, security applications, call log applications, call history applications, presence applications, context applications, text-to-speech applications, speech-to-text applications, and so on.

Although only a single communication server 104 is depicted in FIG. 1, two or more communication servers 104 may be provided in a single system 100 or enterprise network portion 106 of a system 100. A communication server 104 can be configured to include user communication preferences and/or restrictions vis-à-vis the user relation element 102, which map, for a corresponding (enterprise subscriber) user, a set of communication preferences to be invoked for an incoming and/or outgoing contact or communication for each user for whom it is authoritative. The user relation element 112 may additionally include a feature sequencer that is configured to refer to the data structure that maps a user to communication preferences and then instantiate communication preferences for calling and called users and/or communication devices or endpoints 120. The communication preferences for a particular user 122 and/or endpoint 120 are referenced by the feature sequencer functionality of the user relation element 102 to determine which, if any, features should be incorporated into a communication session for the user and/or communication device. The feature sequencer functionality can instantiate the communication features for the communication session by routing the communication-initiation message(s) to the appropriate applications 114, 116 at the appropriate servers 108, 112.

The communication server 104 may be used to help establish communication sessions and to provide features and/or enforce restrictions with respect to communication sessions. The communication server 104 may include a private branch exchange (PBX), an enterprise switch, an enterprise server, combinations thereof, or other types of telecommunications system switch or server. The communication server 104 is, in some embodiments, configured to execute telecommunication functions such as the suite of Avaya AURA™ applications of Avaya Inc., including Communication Manager™, Avaya AURA Communication Manager™ Communication Manager Branch™, Session Manager™, and combinations thereof. Features and restrictions can be provided by the communication server 104 through the incorporation of one or more sequenced applications 114, 116 in a communication session.

Although depicted as being separate servers, it should be appreciated that functions of any particular server can be incorporated into any other server without departing from the scope of the present disclosure. For example, the application server 108 may incorporate the DDP application 116 or the pairing server 112 may comprise various other applications 114. As another example, the communication server 104 may comprise the functionality of the application server 108 and/or pairing server 112.

Once an application sequence is determined by the user relation element 102 for a calling and/or called user 122 and/or communication device 120, the communication server 104 passes the communication-initiating message (e.g., an INVITE message) to a first application 114, 116 in the application sequence, thereby allowing the first application 114, 116 to determine the parameters of the communication session, insert itself into the control and/or media stream of the communication session, and thereby bind itself to the communication session.

Once the first application 114, 116 has established itself into the communication session, the first application 114, 116 either passes the communication-initiating message back to the communication server 104 to so that the user relation element 102 can identify the next application 114, 116 in the application sequence and re-route the communication-initiating message to appropriate server 108, 112. In some embodiments, it may be desirable to have each application 114, 116 pass the communication-initiating message back to the communication server 104 so that each application 114, 116 can operate independently of one another (e.g., does not have to know about any other application 114, 116 in the communication system 100). However, it may also be possible to have one application 114, 116 pass the communication-initiating message to the next application 114, 116 directly. Alternatively or in addition, the message may be redirected, rejected, or the like. Moreover, parties and/or media servers may be added to the call by an application 114, 116, depending upon the functions provided by the application 114, 116.

As can be appreciated by one of skill in the art, this process continues until all sequenced applications 114, 116 for implementing preferences and/or restrictions with respect to users 122 and/or communication devices 120 have been applied to the communication session.

As noted above, the pairing server 112 in accordance with embodiments of the present disclosure provides a DDP application or function 116. As described in greater detail elsewhere herein, the DDP application 116 facilitates the pairing of communication devices 120 for which dynamic device pairing has been provisioned within the pairing server 112. More particularly, the DDP application 116 executed by the pairing server 112 enables two associated endpoints 120, more particularly a pairing and a paired endpoint 120, to participate in a communication session with respect to control signals for that session, while providing media only to the paired device 120. In addition, the pairing methodology disclosed herein enables other sequenced applications to apply their origination functions even on the call between the DDP application and the paired device. For instance, a primary communication feature server can ensure that the pairing user is authorized to call the paired device even though that feature server is separate from the DDP application.

The system 100 also includes a plurality of communication devices or endpoints 120. In particular, the pairing server 112 may be associated with a first or pairing communication device 120a and a second or paired communication device 120b. The system 100 may also include at least one additional communication device 120. For example, the system 100 can include a third communication device 120c, also referred to herein as a far end communication device 120c.

A communication device or endpoint 120 may correspond to a user agent (UA) or multiple UAs of users. Examples of communication devices 120 include, without limitation, a telephone, a soft phone, a cellular phone, a multi speaker communication device (e.g., a conference phone), a video phone, a personal computer (PC), a laptop computer, a tablet computer, a personal digital assistant (PDA), a smart phone, a thin client, or the like. It should be appreciated that a communication device 120 may be configured to support single or multi user interactions with other communication devices 120 within an enterprise, as well as other communication devices 120 that are external to the enterprise.

In accordance with embodiments of the present disclosure, and as described herein, a user 122 of a first communication device (the pairing communication device) 120a may provision the DDP application 116 running on or executed by the pairing server 112 such that the first communication device 120a is paired to a second communication device (the paired communication device) 120b. More particularly, the pairing operation enables the user 122 to present the address associated with the first communication device 120a to other communication devices 120 that are party to a communication session (e.g., the third communication device 120c) and to maintain control of such communications through the first communication device 120a, while establishing the media path through the second communication device 120b. Accordingly, the user 122 can operate his or her pairing communication device 120a to exercise control over the communication session, while using the paired communication device 120b to receive and provide media (e.g., audio content). Moreover, embodiments of the present disclosure accomplish such pairing while maintaining the application of sequenced applications 114, 116 that provide features and/or that apply restrictions to calls associated with the first communication device 120a and/or the second communication device 120b. In addition, such pairing is accomplished through the provision of the pairing server 112 and the DDP application 116, without requiring modifications to SIP enabled communication devices 120 or other components of the system 100. Invocation of the DDP application 116 can be easily implemented by updating a user's communication preferences in the user relation element 102 of the communication server 104.

Various nodes or devices included in the system 100 can be interconnected by one or more communication networks 124. As examples, but without limitation, a communication network 124 may comprise any type and any number of communication mediums and devices which are capable of supporting communication sessions, such as voice calls, video calls, TTY calls, multimedia sessions, or the like. The communication network 124 may include a local area network (LAN), a wide area network (WAN), a session initiation protocol (SIP) network, and/or any other type of packet switched or circuit switched network known in the art. In addition, a first part of the network 124 can operate to interconnect one or both of the first 120a and second 120b communication devices to the pairing server 112 and in turn to the communication server 104. The first part of the network 124 may, as an example, comprise an enterprise network. A second part of the network 124 may connect the communication server 104 to the third communication device 120c.

Figure 2:
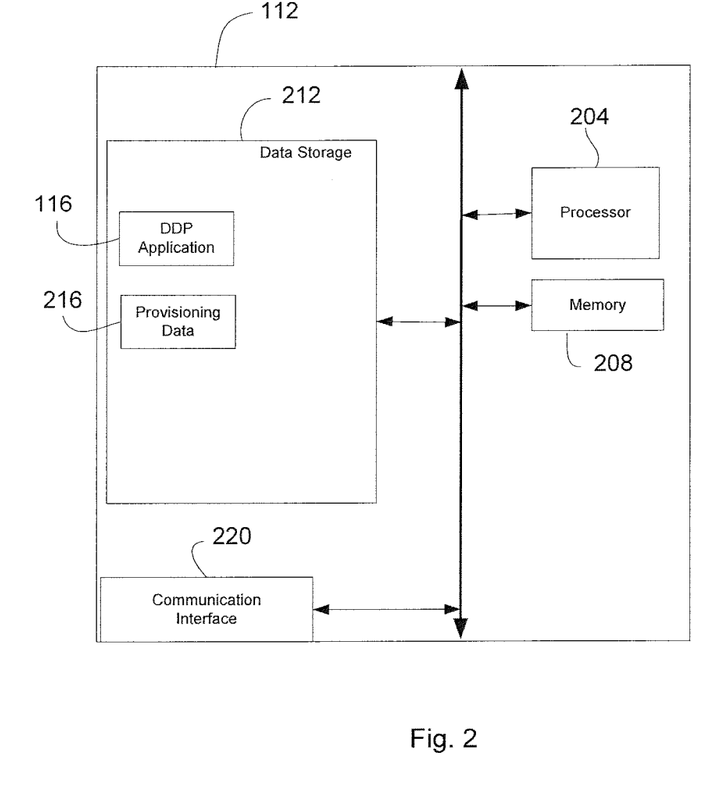
FIG. 2 is a block diagram depicting a pairing server providing a dynamic device pairing function in accordance with embodiments of the present disclosure.

FIG. 2 illustrates components of an exemplary pairing server 112 in accordance with embodiments of the present disclosure. The pairing server 112 in accordance with embodiments of the present disclosure provides DDP services to registered communication devices 120 for which pairing has been provisioned. In general, the pairing server 112 can comprise a general purpose computer or server device that provides various communication functions and features. As a further example, the pairing server 112 may comprise a particular instance of a communication server 104, or may even be implemented by or as part of a communication server 104, instead of as a separate system component. Accordingly, the pairing server 112 can include a processor 204. The processor 204 may comprise a general purpose programmable processor or controller for executing application programming or instructions. As a further example, the processor 204 may comprise a specially configured application specific integrated circuit (ASIC) or other integrated circuit, a digital signal processor, a hard wired electronic or logic circuit such as a discrete element circuit, a programmable logic device or gate array, special purpose computer, or the like. The processor 204 generally functions to run programming code or instructions implementing various functions of the pairing server 112.

The pairing server 112 may also include memory 208 for use in connection with the execution of application programming by the processor 204, and for the temporary or long term storage of program instructions and/or data. As examples, the memory 208 may comprise RAM, SDRAM or other solid state memory. Alternatively or in addition, data storage 212 may be provided. In accordance with embodiments of the present disclosure, data storage 212 can contain programming code or instructions implementing various of the applications or functions executed or performed by the pairing server 112. Like the memory 208, the data storage 212 may comprise a solid state memory device or devices. Alternatively or in addition, the data storage 212 may comprise a hard disk drive or other random access memory.

In accordance with embodiments of the present disclosure, the data storage 212 can include various applications and data. For example, the data storage 212 can include the DDP application 116, the execution of which by the processor 204 implements functions of the pairing server 112 in implementing dynamic device pairing. In addition, the data storage 212 can maintain data regarding registered communication devices 120, and provisioning data 216 for pairing communication devices 120 to one another.

The pairing server 112 can additionally include a communication interface or interfaces 220. The communication interface 220 may provide connectivity between the pairing server 112 and other components of the system 100, including the communications server 104 and communication devices 120, either directly or through one or more networks 124.

FIGS. 3A-1, 3A-2, 3B-1 and 3B-2 illustrate a communication session or call flow in accordance with embodiments of the present disclosure. More particularly, the call flow for an outgoing call made from a pairing device 120a, shown in the example of FIGS. 3A-1 and 3A-2 as a flare device 120a, after provisioning data 216 has been provided to the pairing server 112, is shown. This provisioning data identifies the paired device 120b, and includes an instruction from the user 122 to utilize device 120 pairing. Initially, an INVITE message is sent from the pairing device 120a to the pairing server 112 to originate the call (304).

It should be noted that the communication server 104/user relation element 102 is not depicted in FIGS. 3A-1, 3A-2, 3B-1 and 3B-2 for simplicity. However, as discussed above, the feature sequencer functionality of the user relation element 102 may dictate that the communication server 104/user relation element 102 is between the pairing device 120a, pairing server 112, paired device 120b, application server 108 (referred to as a primary Feature Server (FS) in FIGS. 3A-1, 3A-2, 3B-1 and 3B-2), and other communication devices depicted herein. The communication server 104/user relation element 102 has not been shown to enhance the understanding of the dynamic device pairing concepts described herein. Those skilled in the art will appreciate how the communication server 104/user relation element 102 can be inserted into the message path between each device to ensure proper control of the communication sessions is maintained.

Figure 3A:
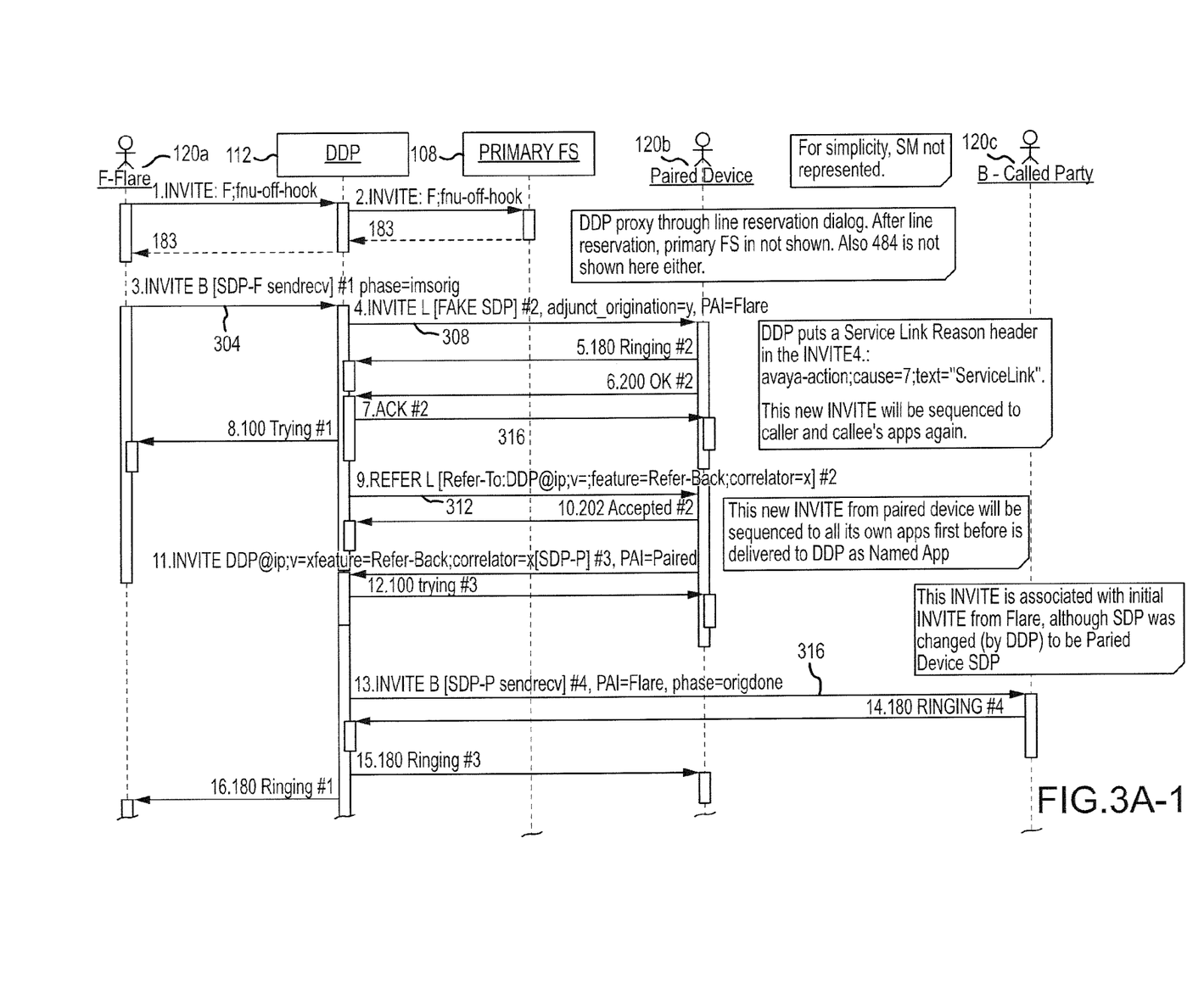
Figure 3A:
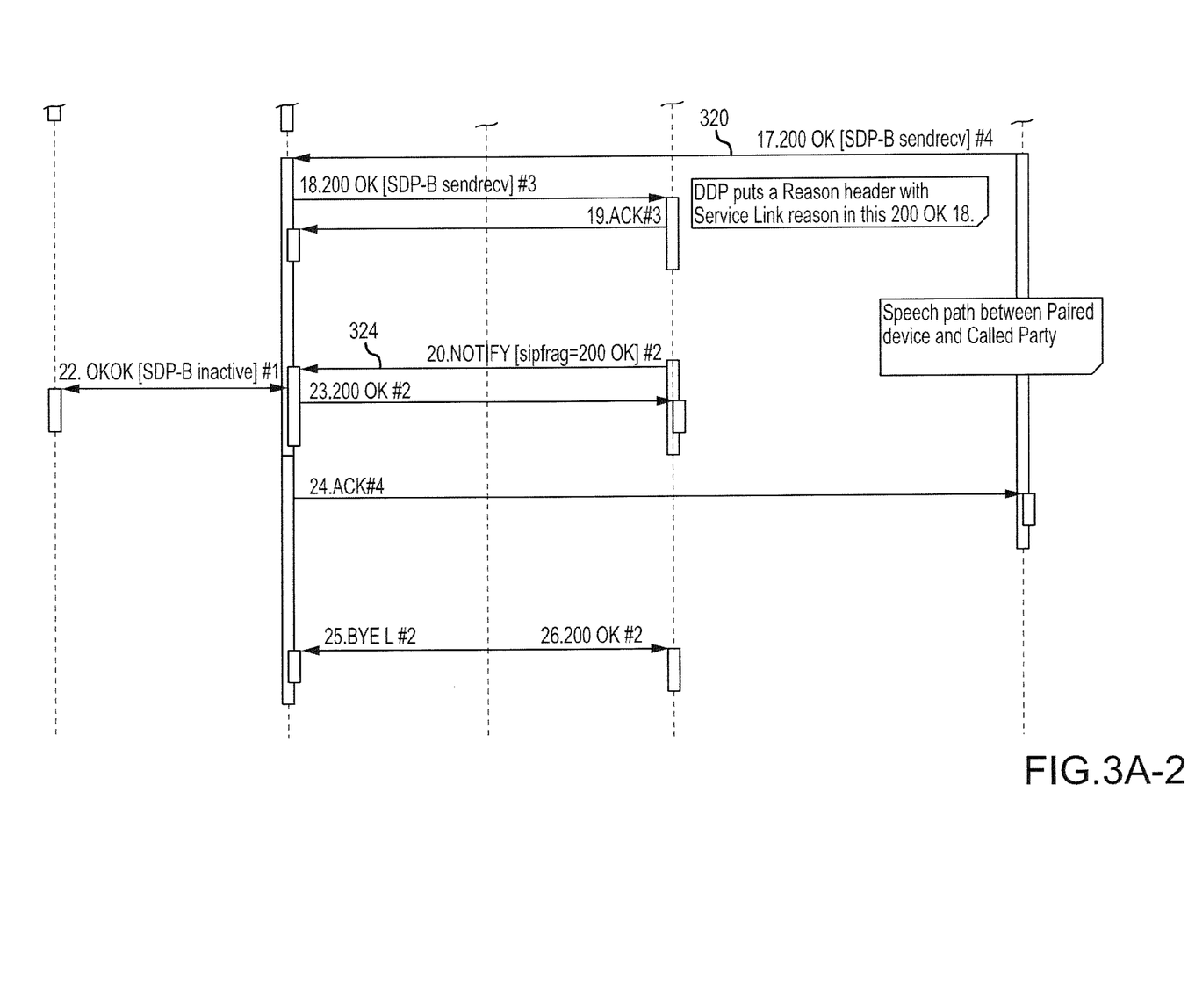

The pairing server 112 then pauses the origination sequence and sends an INVITE message to the paired device 120b with a fake or placeholder SDP associated therewith (308). Alternatively, the pairing server 112 may send the SDP offer from the pairing device 120a. The INVITE message can indicate in a reason header that the call to the paired device 120c is a service link. As used herein, the term "service link" should be understood to include any data or media connection used between the pairing device 120a and paired device 120b to enable control of one device with inputs received at the other device. The "service link" may correspond to a unidirectional or bidirectional communication link.

As a result, the communication server 104 can exclude this link from bandwidth calculations and to report a call topology change if there was any mid-call control on the paired device 120c. When the user answers at the paired device 120b, the DDP application 116 issues a REFER message asking that the user agent associated with the paired communication device 120b initiate a call back to the DDP application 116 with an SDP offer (312). In an alternative embodiment, a "slow start" INVITE is used with the paired device 120b. Specifically, the initial INVITE is sent with no SDP offer and the 200 OK from the paired device 120b has an SDP offer. The ACK message, which isn't sent until the called party 120c answers with a 200 OK message, then has the SDP answer information from the called party 120c. It should be appreciated that the utilization of the "slow start" INVITE achieves a simpler call flow, but the drawback is that the caller doesn't hear the ringback on the paired device 120b.

The DDP application 116 substitutes the SDP offer from the paired communication device 120b for the SDP offer that was sent by the pairing communication device 120a, and the origination sequence is resumed. Thereafter, the remaining origination applications 114 within the primary FS 108 or any other application server for the calling user are then sequenced by the communication server 104 and user relation element 102. Notably, the INVITE message passed to the communication server 104 is associated with the initial invite from the pairing communication device 120a, but with the SDP of the paired communication device 120b. Accordingly, the INVITE message passed to the called communication device 120 (e.g., the paired communication device 120c) (316) shows the pairing communication device 120a as the originating device but has the media offer from the paired device. Since the pairing communication device 120a has an active dialog, it can control the call while the user is talking on the paired communication device 120b, as the media path is established between the paired communication device 120b and the called communication device 120c. The 200 OK response when the called device 120c answers (320) is sent to the paired device 120b (324), with the called device SDP answer and an indication that this is a service link call. A 200 OK is also sent to the pairing device with a "hold" SDP.

Figure 3B:
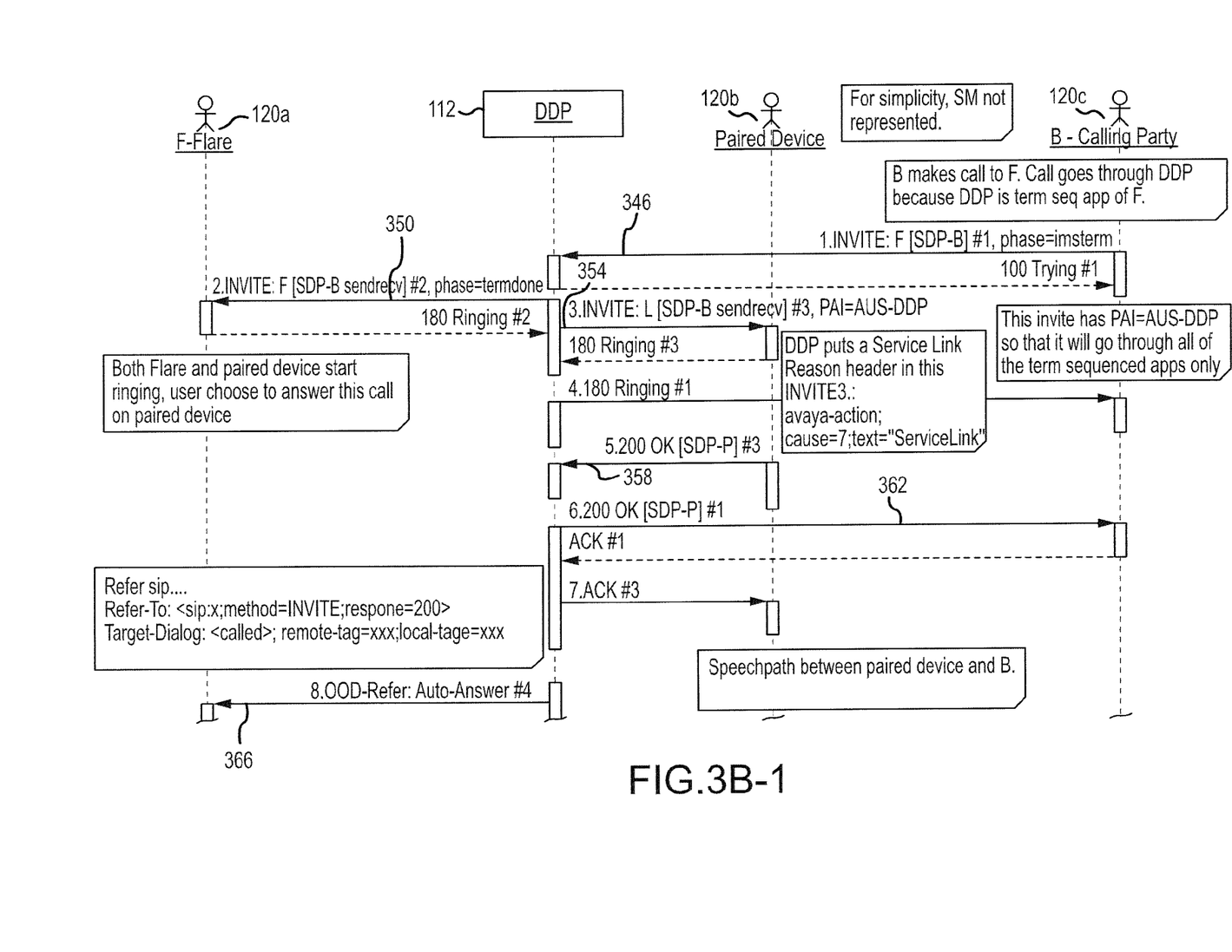
Figure 3B:
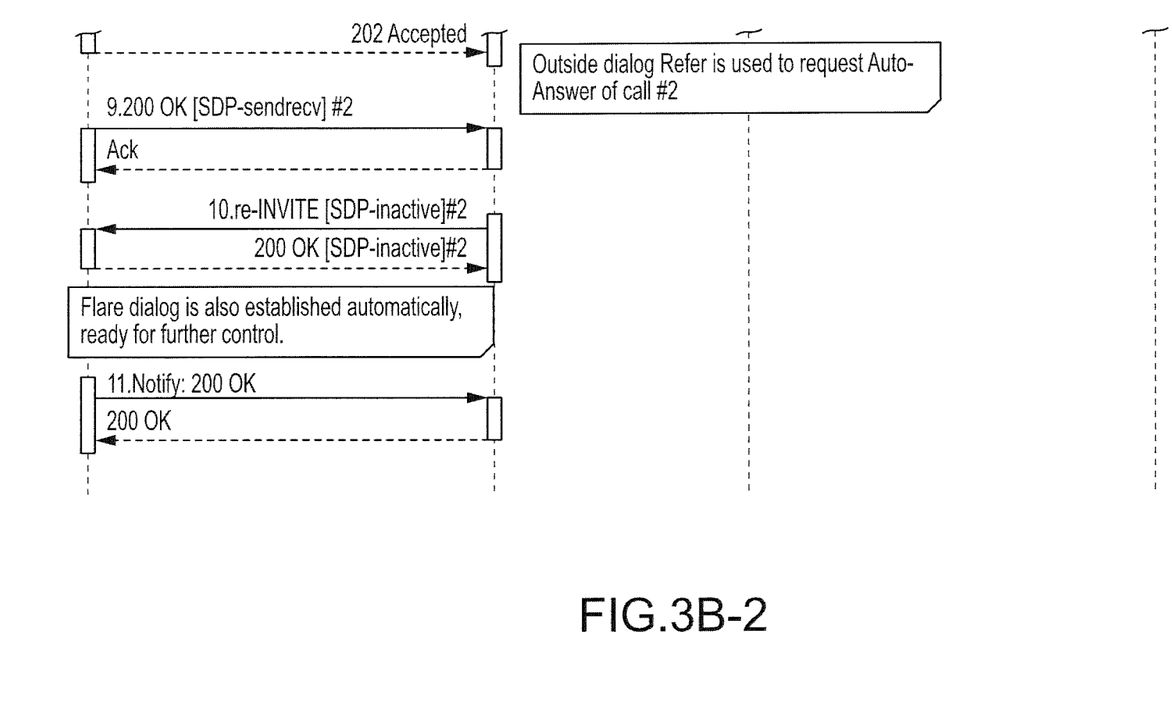

With respect to an inbound call to the first or pairing communication device 120a, the DDP application 116 is generally invoked after all other terminal applications 114 have been invoked by the communication server 104/user relation element 102. The call flow for an incoming call placed to a pairing device 120a that is associated with a paired device 120b is illustrated in the example of FIGS. 3B-1 and 3B-2. In this scenario, the calling party, for example using a third communication device 120c, places a call that results in an INVITE message being sent to the pairing server 112 with the SDP offer of the third communication device 120c (346). That INVITE message is sent to the target device, which in this case is the pairing device 120a (350). The pairing server 112 also sends an INVITE message with the SDP offer of the third communication device 120c to the paired communication device 120b (354). This calling identity in this INVITE to the paired device is set to the identity of the originally called user. This invokes that user's origination applications so that they can ensure that the pairing user is authorized to call the paired device. The result is that both the first 120a and second 120b communication devices are now ringing. The user 122 answers on the paired communication device 120b, with the result that a 200 OK message with the SDP of the paired communication device 120b is sent back to the pairing server 112 (358). The SDP of the paired device 120b is then included in messages passed by the pairing server 112 to the calling or third communication device 120c, establishing a media or speech path between the paired communication device 120b and the calling communication device 120c (362). In addition, a REFER message is sent by the pairing server 112 to the pairing or first communication device 120a to request auto answer of the call made to that communication device 120a by the communication server 112 (366). The auto answer of the call by the first communication device 120a establishes a control path for the communication session that extends to the pairing or first communication device 120a. In addition to being associated with the SDP of the paired or second communication device 120b, messages passed as part of the call providing an exchange of media between the second communication device 120b and the third communication device 120c are associated with the caller ID of the pairing or first communication device 120a. Accordingly, sequenced applications 108 can be applied by a communication server 104 (see FIG. 1) in the call path. Therefore, features and restrictions associated with all of the call or communication session endpoints, in this case communication devices 120a, 120b, and 120c, can be applied. In an alternate embodiment, the user could answer on their pairing endpoint and the DDP application could be configured to send a REFER message to the paired device with an auto answer request.

In both the outbound and inbound cases, the call to the paired communication device 120b is origination sequenced on behalf of the pairing user. This is in addition to sequencing with respect to the pairing device 120a. This ensures that the user doesn't circumvent their origination restrictions. For example, a do not call list application can be applied to assert restrictions. In addition, the pairing communication device 120a can signal call control operations as if it were operating in the absence of a pairing with the paired communication device 120b. Accordingly, the call or media path to the paired communication device 120b follows the control dialog established in connection with the pairing communication device 120a. In addition, the establishment of the media path with the paired communication device 120b is performed through SDP substitution by the DDP application 116. Moreover, such SDP substitution is maintained by the pairing server 112 throughout the duration of the call.

Figure 4:
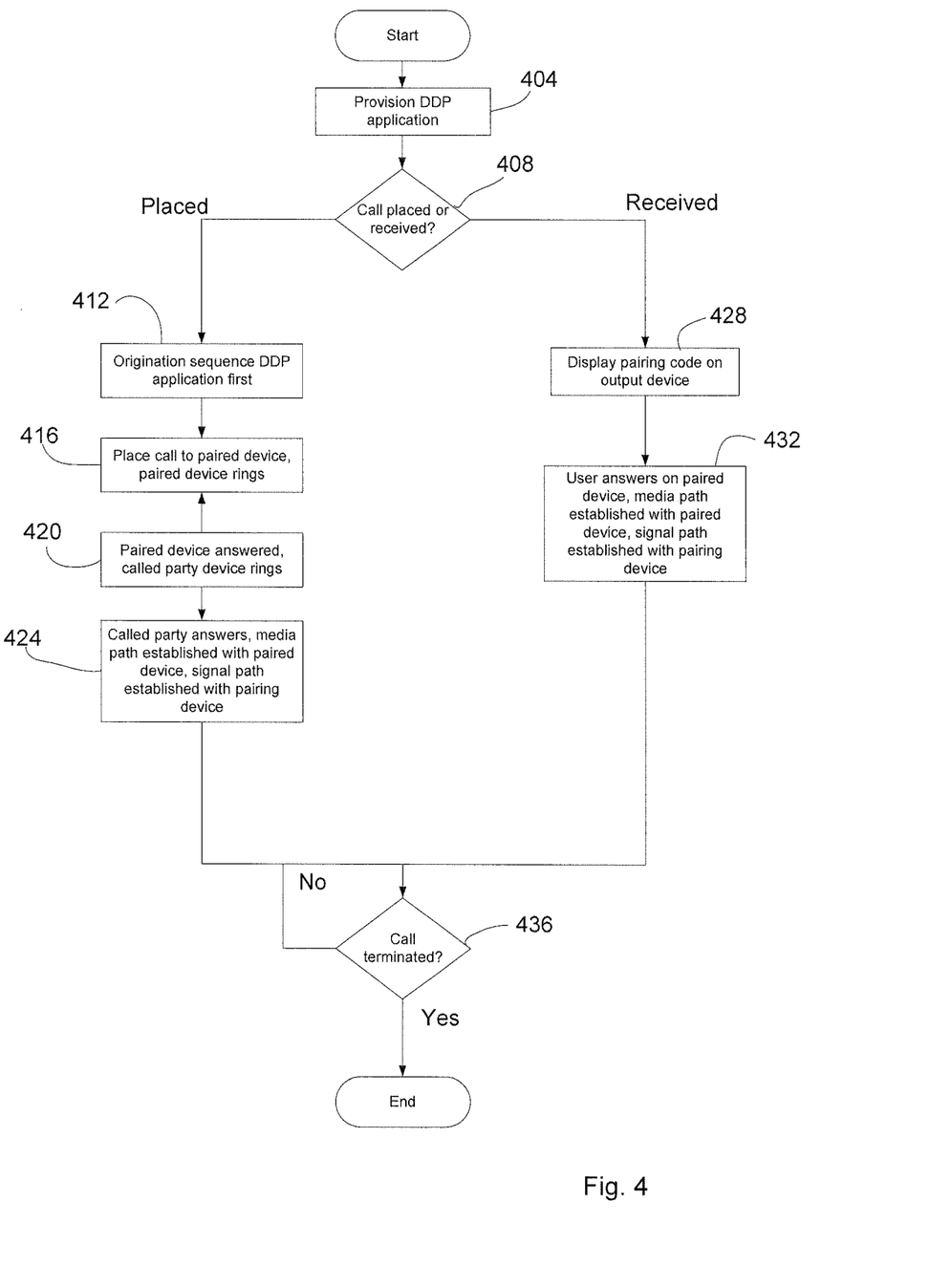
FIG. 4 is a flowchart illustrating aspects of a method for providing dynamic device pairing in accordance with embodiments of the present disclosure.

Aspects of the operation of a system 100 in accordance with embodiments of the present invention are further described in connection with FIG. 4. More particularly, at step 404, the DDP application 116 is provisioned. Provisioning the DDP application 116 can include associating a registered communication device (e.g., the pairing communication device 120a) with a paired communication device 120 (e.g., communication device 120b). Such provisioning can be accomplished through the pairing communication device 120a, or any other device capable of receiving input from the user and delivering such input to the DDP application 116. Moreover, provisioning can include the user 122 logging into a user portal of the pairing server 112, through which the user 122 can activate the DDP service provided by the DDP application 116. Moreover, provisioning can include configuring the paired device 120b number, configuring a pairing duration timeout, or enabling a no timeout option. Such provisioning information can be stored as provisioning data 216 on the pairing server 112.

At step 408, a determination can be made as to whether a call has been placed from or received for the pairing communication device 120a. Where a call is placed from the pairing communication device 120a, the DDP application 116 is origination sequenced before any other sequenced applications 108 (step 412). The origination sequencing is then paused, and a call is placed to the paired communication device 120b with a request for an SDP offer from the paired communication device 120b, and causing the paired device 120b to ring (step 416). When the user 122 answers the call on the paired device 120b (or after an auto answer if the paired device 120b is capable), the called party destination communication device 120c will ring (step 420). The called communication device 120c displays caller line identification related to the user 122. For example, where the pairing device 120a is the user's 122 primary device 120, caller ID information associated with the pairing device 120a is displayed by the called communication device 120c. Ring back is provided to both the pairing 120a and the paired 120b communication devices. Also, if early media is played from the destination, the user 122 will hear it on the paired device 120b, while hearing ring back on the pairing device 120a.

When the called party answers the call at the called communication device 120c, an audio/video media path is established between the paired communication device 120b and the called party communication device 120c (step 424). The pairing device 120a will also have an established call with the called communication device 120c, but without any media, allowing for further call control to be exercised by the calling communication device 120a. More particularly, a call signaling path can be established to the pairing communication device 120a. Both the pairing communication device 120a and the paired communication device 120b show the name and number associated with the called communication device 120c. If the call is dropped from the pairing device 120a, the paired device 120b or called party device 120c, all parties will drop from the call.

Where an incoming call is placed to a pairing communication device 120a, both the pairing communication device 120a and the paired communication device 120b ring, and both the pairing 120a and paired 120b communication devices show the caller name and number (step 428). If the user 122 answers the call on the pairing communication device 120a, the paired communication device 120b will stop ringing and an audio/video media path is established between the pairing communication device 120a and the caller device 120c. The call is established as if there were no pairing configured. In an alternative embodiment, the paired device 120b may be auto-answered if the user 112 answers the incoming call on the pairing device 120a. However, if the user answers the call on the paired communication device 120b, the media path is established between the paired communication device 120b, and the calling communication device 120c (step 432). The call is also established, for example after an auto answer function is performed, on the pairing communication device 120a, but without media, for further call control. In addition, the DDP application 116 is sequenced after other sequenced applications when a call is received at a paired device. If the call is dropped from the pairing communication device 120*a*, the paired communication device 120*b*, or the calling communication device 120*c*, all communication devices 120 will drop from the call.

At step 436, a determination can be made as to whether the call has been terminated. Once the call is terminated, the process ends.

Embodiments of the present disclosure can provide for the pairing of any communication device 120 with any other audio/video communication device 120. In addition, pairing as disclosed herein enables call control to be maintained on a pairing communication device 120*a*, while having the media path established with the paired communication device 120*b*. Moreover, this is accomplished without media splitting or media switching between the pairing 120*a* and paired 120*b* communication devices. The other party to the call is not aware of the pairing.

The paired device can be identified as part of provisioning data 216 by, for example but without limitation, an enterprise canonical or E.164 format. In addition to identifying pairing 120*a* and paired 120*b* communication devices, a user 122 can configure other parameters associated with pairing. Examples of such parameters include a pairing duration timeout. In addition, the ability to pair communication devices 120 can be controlled through the assignment of user service levels. For example, pairing may be allowed only if a device to be paired has a user service level that is lower than or equal to the user service level of the user 122 and/or the pairing communication device 120*a*. In accordance with still other embodiments, if a communication device 120 is already paired to another communication device, a user 122 with a higher user service level than the user who initiated the in-place pairing can force the un-pairing of the user with the lower user service level. During ringing time, for a pairing communication device 120*a* originated call, the pairing communication device 120*a* displays the far end number only, the paired communication device 120*b* displays a message such as "AUS DDP Service", while the far end communication device 120*c* shows the name/number information of the pairing communication device 120*a*. During ringing time for an incoming call to the pairing communication device 120*a*, both the pairing 120*a* and paired 120*b* communication devices may be configured to show the far end name and number, while the far end communication device 120*c* shows the pairing communication device 120*a* number. This display of far end name and number is not necessary and may not be performed in all instances.

When a call is established, both the pairing 120*a* and paired 120*b* communication devices show a far end name and number, while the far end communication device 120*c* shows the pairing communication device 120*a* name and number. In addition, while pairing is provisioned, a call originated by the paired communication device 120*b* can be controlled using the pairing communication device 120*a*.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

The invention claimed is:

1. A communication system, comprising:
   a microprocessor; and
   a computer readable medium coupled to the microprocessor and comprising a dynamic device pairing application that causes the microprocessor to pair a first communication device with a second communication device and provisioning data comprising a record of a pairing relationship between the first communication device and second communication device, wherein the first communication device is a pairing communication device and wherein the second communication device is a paired communication device;
   wherein the microprocessor:
      intercepts a call with respect to the first communication device prior to delivery of the call; and
      applies the dynamic device pairing application to the call that causes the microprocessor, in accordance with the record of the pairing relationship, to establish a media session between the second communication device and a third communication device as part of the call, wherein a media stream of the media session is not provided to the first communication device.

2. The communication system of claim 1, wherein the microprocessor enables control for the call by the first communication device, wherein the dynamic device pairing application is one of a sequence of applications applied to the call, the sequence of applications comprising a further application that causes the microprocessor to provide one of the following features: call recording, find-me/follow-me, extension to cellular, call forwarding, call coverage, encryption, security, call logging, call history, presence, context, text-to-speech, or speech-to-text.

3. The communication system of claim 1, wherein the dynamic device pairing application is part of an origination sequence of applications applied to the call, wherein the origination sequence of applications cause the microprocessor to apply origination restrictions on the call to the second communication device, and wherein the microprocessor establishes the media session by providing a session description protocol descriptor associated with the second communication device to the third communication device.

4. The communication system of claim 1, wherein the dynamic device pairing application is part of an origination sequence of applications applied to the call, wherein the origination sequence of applications cause the microprocessor to apply origination restrictions on the call to the second communication device, wherein the microprocessor establishes the media session by providing a session description protocol descriptor associated with the second communication device to the third communication device, wherein a session description protocol descriptor associated with the first communication device is not provided by the microprocessor to the third communication device, wherein the session description protocol descriptor associated with the first communication device is replaced with a session description protocol descriptor associated with the second communication device, wherein identification information associated with the first communication device is used for one of application processing or display to the second communication device, wherein the call is placed from the third communication device to the first communication device, wherein the call is received by the first and second communication devices, and wherein the call is answered at the second communication device.

5. The communication system of claim 1, wherein the dynamic device pairing application is part of an origination sequence of applications applied to the call, wherein the origination sequence of applications cause the microprocessor to apply origination restrictions on the call to the second communication device, wherein the microprocessor establishes the media session by providing a session description protocol descriptor associated with the second communication device to the third communication device, wherein a session description protocol descriptor associated with the first communication device is not provided by the microprocessor to the third communication device, wherein the session description protocol descriptor associated with the first communication device is replaced with a session description protocol descriptor associated with the second communication device, wherein identification information associated with the first communication device is used for one of application processing or display to the second communication device, wherein the call is placed from the third communication device to the first communication device, and wherein the call is auto-answered on the second communication device when the call is answered at the first communication device.

6. The communication system of claim 1, wherein the call is placed by the first communication device to the third communication device, wherein the first communication devices provides audible input to and receives audible output from the second communication device, and wherein the first communication device is placed in far end hold.

7. The communication system of claim 1, wherein the call is placed by the first communication device to the third communication device and wherein ringback is played on the second communication device.

8. The communication system of claim 1, wherein the call is placed by the first communication device to the third communication device and wherein a slow start INVITE is utilized and no ringback is played on either the first communication device or the second communication device.

9. The communication system of claim 1, wherein the media stream of the media session is provided to the second communication device and wherein the call is terminated in response to any one of the first communication device, the second communication device, or the third communication device dropping the call.

10. The communication system of claim 1, wherein the microprocessor enables control for the call by the first communication device, wherein the dynamic device pairing application is one of a sequence of applications applied to the call, the sequence of applications comprising a further application that causes the microprocessor to provide one of the following features: call recording, find-me/follow-me, extension to cellular, call forwarding, call coverage, encryption, security, call logging, call history, presence, context, text-to-speech, or speech-to-text.

11. A communication system, comprising:
a microprocessor; and
a computer readable medium coupled to the microprocessor and comprising a dynamic device pairing application that causes the microprocessor to pair a first communication device with a second communication device and provisioning data comprising a record of a pairing relationship between the first and second communication devices, wherein the first communication device is a pairing communication device, and wherein the second communication device is a paired communication device;
wherein the microprocessor:
intercepts a call with respect to the first communication device prior to delivery of the call; and
applies the dynamic device pairing application to the call that causes the microprocessor, in accordance with the record of the pairing relationship, to establish a media session between the second communication device and a third communication device as part of the call, wherein a media stream of the media session is provided to the second communication device.

12. The communication system of claim 11, wherein the dynamic device pairing application is part of an origination sequence of applications applied to the call, wherein the origination sequence of applications cause the microprocessor to apply origination restrictions on the call to the second communication device, and wherein the microprocessor establishes the media session by providing a session description protocol descriptor associated with the second communication device to the third communication device.

13. The communication system of claim 11, wherein the dynamic device pairing application is part of an origination sequence of applications applied to the call, wherein the origination sequence of applications cause the microprocessor to apply origination restrictions on the call to the second communication device, wherein the microprocessor establishes the media session by providing a session description protocol descriptor associated with the second communication device to the third communication device, wherein a session description protocol descriptor associated with the first communication device is not provided by the microprocessor to the third communication device, wherein the session description protocol descriptor associated with the first communication device is replaced with a session description protocol descriptor associated with the second communication device, wherein identification information associated with the first communication device is used for one of application processing or display to the second communication device, wherein the call is placed from the third communication device to the first communication device, wherein the call is received by the first and second communication devices, and wherein the call is answered at the second communication device.

14. The communication system of claim 11, wherein the dynamic device pairing application is part of an origination sequence of applications applied to the call, wherein the origination sequence of applications cause the microprocessor to apply origination restrictions on the call to the second communication device, wherein the microprocessor establishes the media session by providing a session description protocol descriptor associated with the second communication device to the third communication device, wherein a session description protocol descriptor associated with the first communication device is not provided by the microprocessor to the third communication device, wherein the session description protocol descriptor associated with the first communication device is replaced with a session description protocol descriptor associated with the second communication device, wherein identification information associated with the first communication device is used for one of application processing or display to the second communication device, wherein the call is placed from the third communication device to the first communication device, and wherein the call is auto-answered on the second communication device when the call is answered at the first communication device.

15. The communication system of claim 11, wherein the call is placed by a first user from the first communication device to the third communication device, wherein the first user provides audible input to and receives audible output from the second communication device, and wherein the first communication device is placed in far end hold.

16. The communication system of claim 11, wherein the call is placed by a first user from the first communication device to the third communication device and wherein ringback is played on the second communication device.

17. The communication system of claim 11, wherein the call is placed by a first user from the first communication device to the third communication device and wherein a slow start INVITE is utilized and no ringback is played on either the first communication device or the second communication device.

18. The communication system of claim 11, wherein the media stream of the media session is provided to the second communication device and wherein the call is terminated in response to any one of the first communication device, the second communication device, or the third communication device dropping the call.

19. An enterprise communication system, comprising:
a microprocessor;
a computer readable medium coupled to the microprocessor and comprising an origination sequence of applications that are applied to a call, the origination sequence of applications causing the microprocessor to apply origination restrictions on the call, and provisioning data comprising a record of a pairing relationship between a first communication device and a second communication device, wherein the first communication device is a pairing communication device and wherein the second communication device is a paired communication device; and
wherein the microprocessor:
intercepts the call prior to delivery of the call; and
applies a first sequenced application of the origination sequence of applications to the call that causes the microprocessor, in accordance with the record of the pairing relationship, to establish a media session between the second communication device and a third communication device as part of the call, wherein a media stream of the media session is provided to the second communication device but not to the first communication device, and wherein the origination sequence of applications comprises a second application that causes the microprocessor to provide one of the following features to the call: call recording, find-me/follow-me, extension to cellular, call forwarding, call coverage, encryption, security, call logging, call history, presence, context, text-to-speech, or speech-to-text.

* * * * *